Sept. 18, 1951 G. V. NOLDE 2,568,086
PRESSURE CONTROLLER
Filed March 26, 1945 4 Sheets-Sheet 1
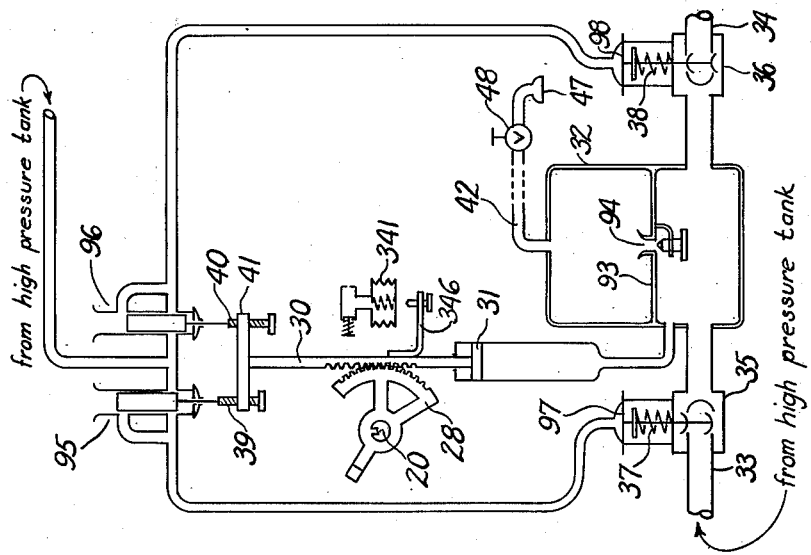
INVENTOR.
George V. Nolde
BY

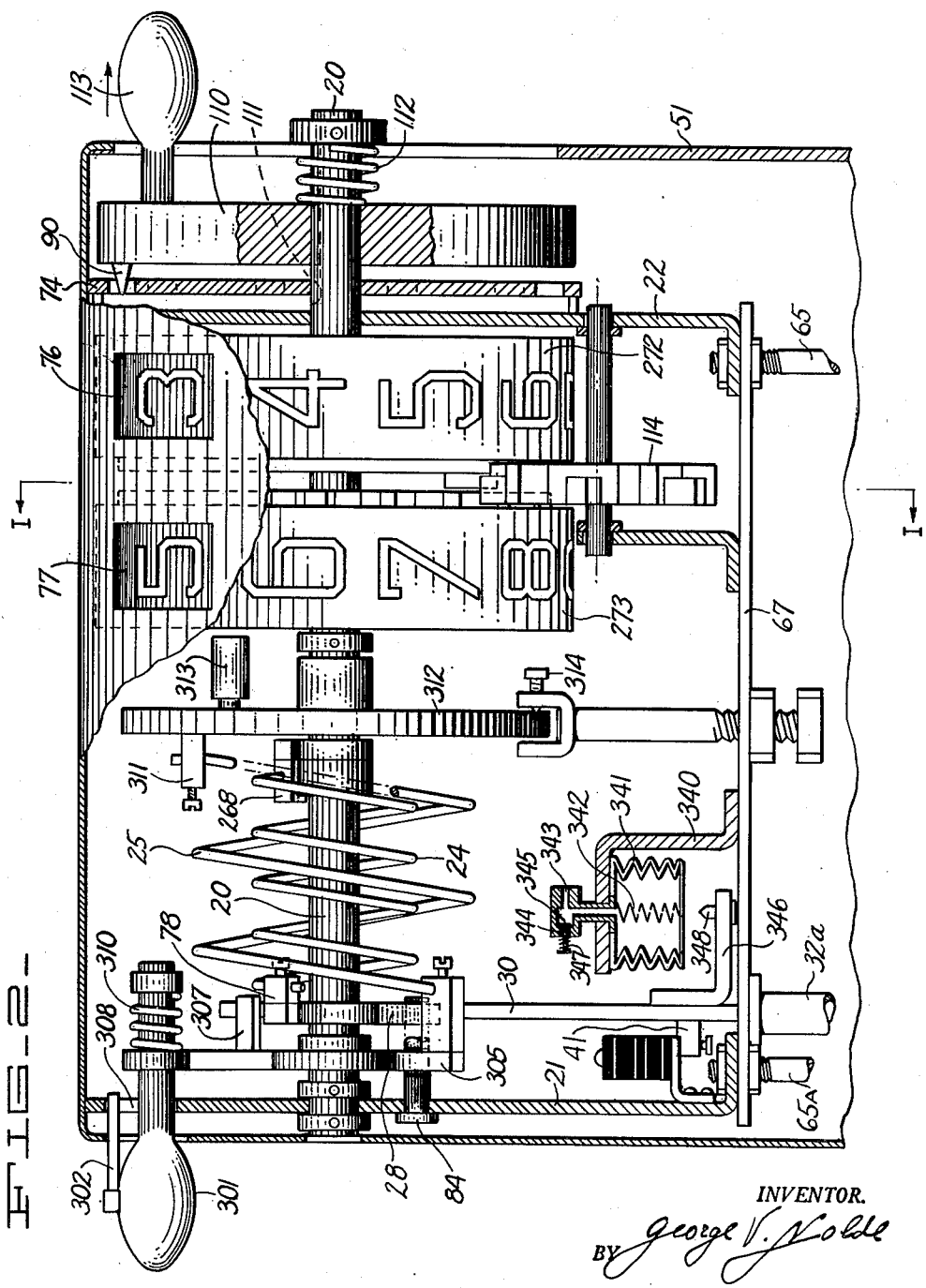

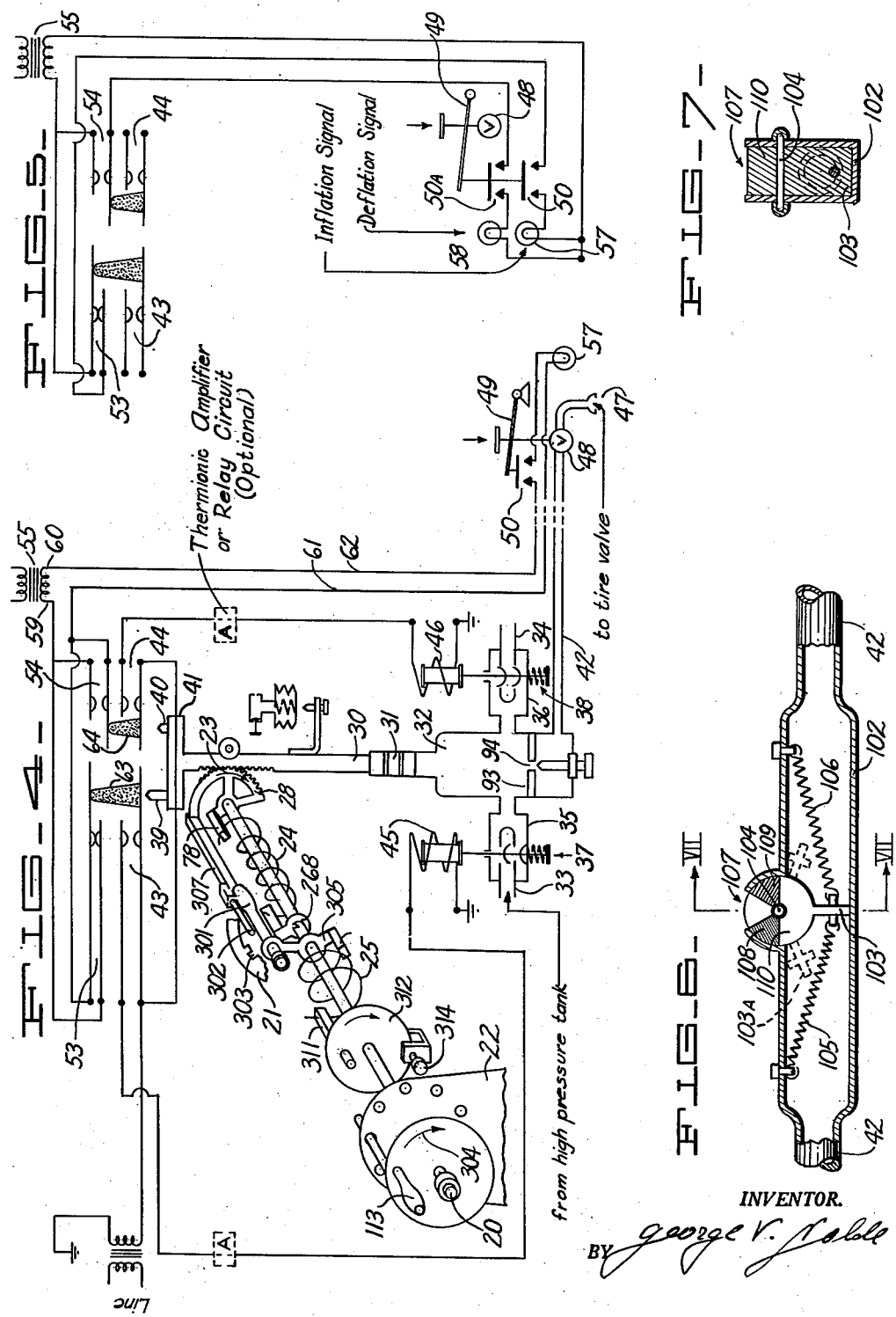

Sept. 18, 1951  G. V. NOLDE  2,568,086
PRESSURE CONTROLLER
Filed March 26, 1945  4 Sheets-Sheet 4
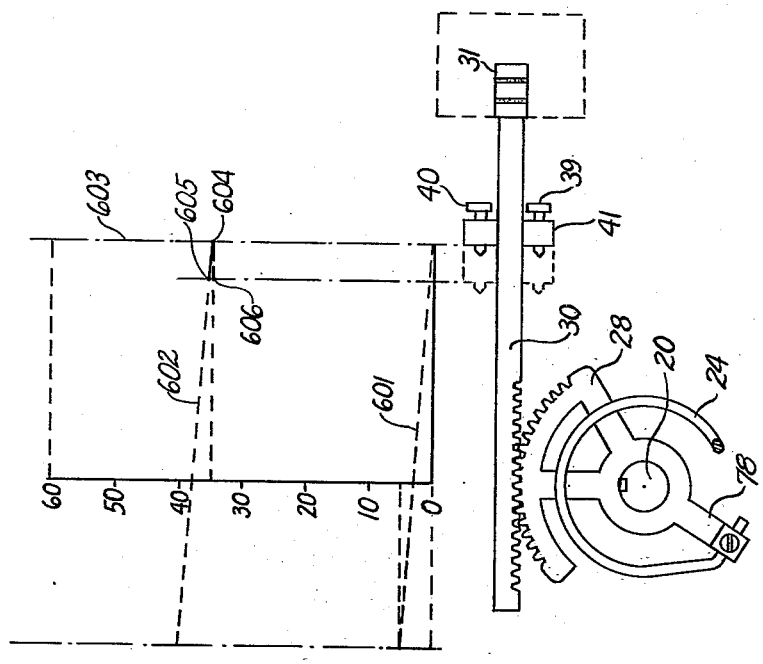
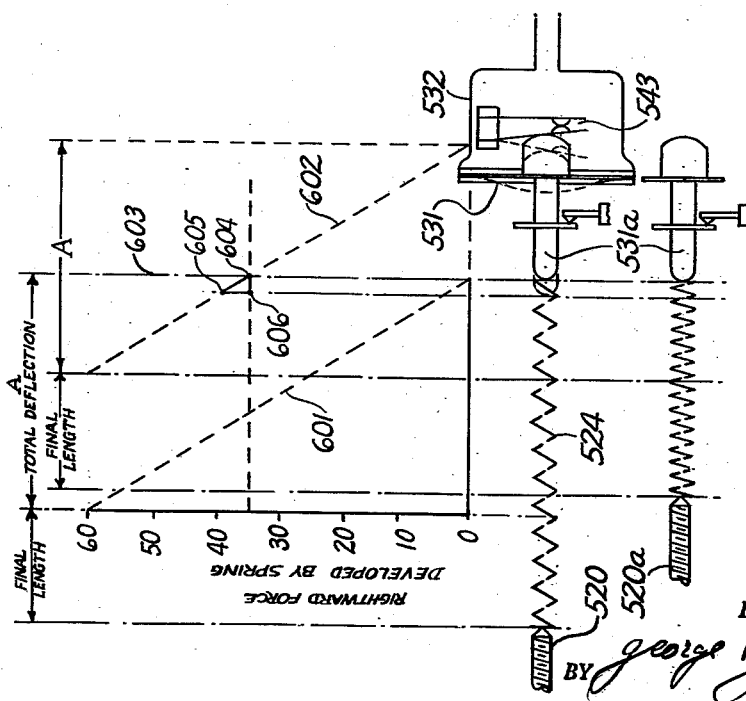
INVENTOR.
George V. Nolde
BY Patented Sept. 18, 1951

2,568,086

UNITED STATES PATENT OFFICE 2,568,086

PRESSURE CONTROLLER

George V. Nolde, Berkeley, Calif.

Application March 26, 1945, Serial No. 584,864

2 Claims. (Cl. 50—35)

This invention relates to the technique of inflating pneumatic tires on an automotive vehicle by presetting a desired value of air pressure.

There are known in the art the mechanisms which would control inflation of an underinflated tire, in this manner. For example J. C. Woodford in a Patent #1,655,003 of January 3, 1928, discloses an apparatus whereby the value of the desired pressure may be preset on an apparatus located at the root end of a service hose. The free end of the service hose has a manually operated simple oneway valve and a suitable nozzle for connecting the hose to the tire inlet tube. If the tire contains the air under lower pressure than that preset on the apparatus at the root end of the service hose, the apparatus starts admitting the air into the hose until the pressure therein is equal to the value preset on the controller. During such admitting the air into the tire there is initiated an audible signal the termination of which indicates the completion of the tire inflation.

However, if the tire initially has a higher pressure than that preset on the apparatus dial, the tire is not vented automatically, but in as much as in the same time no audible signal is initiated there is no indication about the actual condition of the tire pressure.

There are several constructions representing the various improvements of the mechanical features of the above mentioned invention. U. S. Patents Nos. 1,918,341, 2,057,889, 2,126,693, 2,162,474, and several others illustrate the general trend pursued by the technicians following the teachings disclosed by Woodford in previously mentioned Patent #1,655,003. It should be noted, however, that with exception of the mechanism disclosed in the U. S. Patent #2,057,889 (inventor H. G. Fagan) the rest of the improvements achieve substantially the same operational characteristics as does Woodford.

Every one of the above mentioned structures possesses a pressure responsive means operable to shut off the inlet of air into the tire after the pressure inside of the tire has reached the preset value. Said pressure sensitive means is adjusted through the instrumentality of a helical tension or compression spring whose entire range of adjustment is very short due to the chosen principle of operation for such a spring. The small length of such adjustment range allows but a small fraction of an inch of adjusting movement for each pound per square inch of the air pressure to be controlled.

In operation of the devices of above mentioned type the air is admitted into measuring chamber more rapidly than it normally passes into the tire and the pressure in such chamber is built up instantly above that for which the adjusting spring is set (refer to the U. S. Patent #Re. 19,148 of April 24, 1934, page 2, lines 145 to 150, the same phenomenon is also disclosed in U. S. Patent #2,162,474 of June 13, 1939, page 4, lines 17–20). These conditions of operation in addition to the high gradient of force (rate) of adjusting springs due to said short range of adjustment would require an extremely critical setting for achieving the venting as well as inflation in these mechanisms. Without resorting to such critical setting the vent valve would operate simultaneously with inlet valve too often, thus continually upsetting the utility of the device.

The difficulty of above explained nature is avoided in Fagan mechanism (U. S. Pat. #2,057,889) by using as a pressure sensitive means a column of mercury. This allows for the length of the above mentioned range of adjustment to be about 30 inches for each 15 pounds per square inch of pressure instead of the interval close to one inch for the same 15 p. s. i. pressure gradient obtained in previously discussed mechanisms. This arrangement of Fagan allows the installation of the venting as well as inflating controls, which requires some appreciable time for initiation of the venting or inflation. The latter is due to the necessary provisions for the resistance to the movement of the mercury column to avoid its oscillation and misfunctioning (U. S. Pat. #2,057,889, page 4, lines 47 to 57).

The provision of damping means by itself would not specifically retard the operation of Fagan's type of a dispensing device. The damping of some or other sort is necessary to employ in all systems of any type of air dispensing devices. Fagan's device, however, differs from others not only by the nature of the pressure measuring means (mercury column as against spring loaded diaphragm), but also by the nature of cooperation between said pressure measuring means and pressure responsive means (electrical contacts or their mechanical equivalents).

In both these classes of apparatuses the movement of a pressure measuring device actuates a pressure responsive means. But in Woodford and similar systems the adjustment is achieved by changing the characteristic of the pressure measuring means proper (increasing the diaphragm loading), whereas in the Fagan system such adjustment is obtained by changing the position of the pressure responsive device (a contact slider) relatively to the pressure measuring means (mercury column); while the latter retains the constant characteristic of response to pressure.

The movement of the mercury column therefore in the Fagan device for actuating the venting or inflation is therefore materially increased as against Woodford and similar systems not only due to said extension of distance intervals for a given pressure gradient but also due to the using of the different mode of pressure response actuation as above explained.

This delineation may be observed, by the way, in relation also to many other and earlier concepts in the allied arts of pressure controlled devices, reviewing of which however would be superfluous for the understanding of this specification.

In the hereinafter presented invention the method of adjustment used by Fagan is not followed. Rather the mode of actuation of the pressure responsive means is employed whereby the position of such means is not changed during adjustment relative to the pressure measuring means. In herein presented mechanism, however, a special arrangement of the pressure measuring means is used, whereby range of adjustment per unit of pressure gradient is not limited by geometric dimensions of the parts employed but may be chosen at will. Thus reliable presetting of both venting and inflation may be provided, without resort to the highly critical devices or undue retarding of operation.

Thus one of the objectives of this invention is to provide an improved type of a tire inflation controller having the pressure presetting means automatically controlling the inflation, as well as venting of a tire.

Further objective of this invention is to provide a tire inflation controller having an improved type of indicating means signaling the beginning and the end of the processes of the inflation and venting, whereby these signalling means are prevented from indicating the functioning of the controller initiated by leakage or other accidental causes not connected with intentional use of the controller.

Further objective of this invention is to provide a governor having greatly extended range of pressure adjustments and yet the high accuracy of pressure regulation.

Further and more specific objective of this invention is to provide a tire inflation controller on which the presettable value for automatic control of tire pressure may be set by two separate adjusting means of which one controls the rough adjustment and the other the fine adjustment.

Still further and more specific objective of this invention is to provide a pressure governor in which the pressure adjustment is accomplished with several load imposing means for rough adjustment, and consecutive finer adjustment.

Still further objective of this invention is to provide a tire inflation controller having signal means for signalling the beginning and the end of the processes of inflation and venting in which these signal means have an especially simple structure suitable to be placed at the end of the flexible hose and not requiring any adjustment.

Still further and more specific objective of this invention is to provide a force measuring device giving especially convenient reading of the measured force and high accuracy thereof.

Further objectives of this invention will appear more clearly from the attached specification and drawings:

Figure 1 of the drawings presents the side view of the pressure presetting mechanism shown in section along the line I—I on Figure 2.

Figure 2 presents a front view of the pressure presetting mechanism with some parts broken away for clearness of view.

Figure 3 shows in a diagrammatic way a modification of the invention using pneumatic valves instead of electrical contacts for pressure controlling.

Figure 4 shows a diagram of connections between the various components of this tire controller.

Figure 5 shows a modification of connections for the signalling means whereby inflation is signalled by one signal and venting is signalled by a second separate signal.

Figure 6 shows a modification of signalling means in longitudinal section whereby in this modification a single device has three positions to indicate (a) no delivery, (b) venting of the tire in process, (c) inflating of the tire in process.

Figure 7 is a lateral section of the device shown on Figure 6 taken on the line VII—VII of the latter.

Figure 8 shows a diagram of forces in a conventional type of a pressure responsive device.

Figure 9 shows a diagram of forces in the herein described improved type of the pressure responsive device.

On all drawings like components are denoted by like numerals and/or letters.

The general principle of the herein disclosed system now will be explained, at first omitting description of the details, which will be described later in this specification with greater particularity.

In this invention there is provided a tire inflation indicator and controller which has at the end of the hose near the tire valve nozzle only a simple valve and a signal means such as a small electric light or a bezel, while the pressure measuring gage equipped with a pressure presetting dial controls automatically inflating or venting of the tire tube and is placed on a stationary support at the root end of the flexible hose. This pressure measuring presettable controller may be placed, if desired, at the dashboard of a car with hoses extended to each wheel and connected to each tire valve by a junction device similar to that described in the U. S. Patent #1,796,482 of March 17, 1931 (refer to Figs. 4, 5 and 6 of that patent). In this case a small air pressure reservoir connected to that controller may be carried by the vehicle. Herein described form of this mechanism however is more suitable to be installed on the garage floor and connected to the common air pressure supply in the garage.

The garage attendant presets the dial at the measuring gage to the desired pressure, applies the nozzle of the flexible hose to the tire valve, opens the valve at the end of the hose and watches the signal light located on that valve. This light burns only when the tire pressure is in the process of being brought to the value previously preset on the above mentioned dial at the stationary end of the hose. As soon as the tire pressure reaches that preset level said signal light goes out and the attendant is thus informed that the tire pressure is at the desired level. Simultaneously with this signal light action, the inflation (or venting) is automatically stopped. All venting or inflating is initiated and stopped without attendant's control; all he had to do is to hold the end valve open and when the light goes out he may at his leisure close that end valve and attend to the next wheel in the similar fashion.

The general idea of the operation of the device may best be understood by referring to Figures 1, 2 and 4.

The shaft 20 is journalled properly in the side walls 21 and 22 which are mounted within the housing 51. To that shaft are keyed the crankwheel 110 and the lever 268, whereas the wheel 312, the lever 305 and the tooth sector 28 are rotatably supported by the shaft 20, so that these parts (312, 305 and 28) are free to rotate relatively to the shaft 20. The lever 304 has an integral adjunct 307 (Figs. 2 and 4) which is capable of transmitting the clockwise torque to the sector 28 upon clockwise rotation of the lever 305 around the shaft 20. The sector 28 is also urged clockwise by the torque supplied to its tail 78 (Figs. 4 and 1) from the spring 24.

The tension of the spring 24 is controlled by rotating the crank 113 until a desired amount of the revolutions is made to achieve a predetermined torque. Counting wheel 272 (Fig. 2) changes one figure for every tenth of one revolution of the crank 113 and counting wheel 273 changes one figure for every single revolution of the crank 113. The spring 25 on the other hand is initially prewound and its torque remains constant in a given apparatus. The torque of this spring 25, however, may be entirely prevented from influencing the sector 28 by moving the crank 301 counterclockwise until its adjunct 302 is retained by the notch 303 which is provided in the mounting plate 21 (Fig. 1, 2 and 4). With this latter position of the crank 301, the spring 24 alone urges by its tension the sector 28 clockwise.

The torque in clockwise direction imposed by the spring 24 upon the shaft 20 is at the maximum when the handle 113 has been turned six and five tenths revolutions in the direction of the arrow 304 that is to say clockwise (Figs. 4 and 1). On the other hand the spring torque has the minimum value when the handle 113 has not been rotated at all. In this position the torque of the spring 24 is just sufficient to counter-balance some irregular distribution of weight around the axis of the shaft 20 so as to achieve substantially zero torque on that shaft.

The joint torque of the springs 24 and 25 or the torque of the spring 24 alone, as regulated by the positioning of the handles 113 and 301 is transmitted to the rack 30 by means of the gear sector 28 which is supported on the shaft 20. This joint torque of the springs 24 and 25 thus urges the rack 30 downwards with the force corresponding to the position of the handle 113 and initial prewind of the spring 25. Whereas if the handle 301 is positioned against the notch 303, then the rack 30 is urged downwards with the torque regulated by the handle 113 alone.

At the lower end of the rack 30 there is a piston 31 which is urged upward by the air pressure from a reservoir 32 directly connected with the space inside of the tire through the flexible hose 42. To this reservoir 32 there are attached two pipes 33 and 34 (Fig. 4) having electrically operated valves 35 and 36, of which the pipe 33 is connected to the source of the high pressure air and the pipe 34 communicates with the outside air. Spring 37 tends to keep the valve 35 open and the spring 38 tends to keep the valve 36 closed.

When the force on the piston 31 proportional to the pressure inside of the tire is equal to the force established by the torsion springs 24 and 25; the rack 30 is in such a position of equilibrium, that the adjustment screw 39 fixed in the cross piece 41 (integral with the rack 30) closes the switch 43. The screw 40 at that moment is just ready to close switch 44 but yet does not do it due to the existence of a definite distance interval between the screw 40 and the switch 44. Proper choice of that distance will be described later.

The switch 43, when closed, energizes the solenoid 45 which counterbalances the spring 37 and closes the valve 35. The switch 44, when closed, energizes the solenoid 46 which counterbalances the spring 38 and opens the valve 36.

If the pressure inside of the tire creates the force on the piston 31 such that the rack 30 produces a counterclockwise torque greater than the clockwise torque established by the springs 24 and 25 (or by the spring 24 alone if the handle 301 is correspondingly moved), then these two counteracting torques establish equilibrium at a position corresponding to a greater wind-up than that corresponding to the positions when the switch 43 alone is closed. The rack 30 is then pushed upward and in addition to the switch 43 the switch 44 becomes closed also. In such a case the solenoid 46 becomes energized and opens up the valve 36.

Inasmuch as in such a situation the valve 35 is closed by previous action of the contacts 43, the pressure is vented out from the tire and reservoir 32. This venting continues until the equilibrium between the force on the piston 31 and that produced by the springs 24 and 25 is established at the position of the rack 30 whereby switch 44 just opens and the switch 43 is still closed. At this position the system will remain in equilibrium until the pressure on the piston 31 is changed again.

In cases when the pressure inside reservoir 32 is less than that corresponding to the preset positions of the handles 113 and 301, the rack 41 will then be pushed by the spring torque downwardly and both switches 43 and 44 will be open. This will produce opening of the valve 35 (due to de-energized condition of the solenoid 45) while the valve 36 will remain closed. The pressure will be admitted to the reservoir 32 and subsequently to the space inside the tire.

For starting the process of venting or inflation of the tire, the nozzle 47 (Fig. 4) is pressed to the tire tube valve outlet and then the valve 48 located near the end of the hose 42 is manually opened. The valve 48 by means of a suitable built-in linkage 49 closes the push button 50 placed preferably in a common housing with the valve 48. This push button operates in the low voltage circuit of the transformer 55 (or any other suitable low voltage source) in the following manner.

The circuit of the secondary winding of the transformer 55 runs from the terminal 59 to the two switches 53 and 54 (placed in this circuit in parallel) then to the lead 61 located inside of the flexible hose going to the tire valve, thereafter this circuit passes through a small signal lamp 57 placed near the end of the hose 42, and then this circuit returns through the push button 50 and the lead 62 to the terminal 60.

Switch 53 is operated simultaneously with the switch 43 by the same screw 39 through the insulation bushing 63 so that when the switch 43 closes the switch 53 opens. The switch 54 closes together with the switch 44.

Suppose that the pressure in the tire corresponds to the value preset by the handles 113 and 301 then the switch 43 remains closed and switch 53 remains open both due to the position of the equilibrium of the rack 30 as explained before. For the same reason switches 44 and 54 remain both open. Under this condition the circuit of the secondary winding of the low voltage transformer 55 remains open and the signal lamp 57 does not light up. When the rack 30 is below or above that position of equilibrium either the switch 53 or 54 is closed for the duration of such positioning of the rack 30 and the light 57 lights up until this equilibrium position is restored due to venting or inflating of the tire to the pressure corresponding to that equilibrium.

In Fig. 5 there are shown two signal lamps 58 and 57. The push button at the valve 48 has two switches 50 and 50A. The lamp 57 indicating inflation process is operated jointly by the switches 53 and 50 in the similar way as was described with reference to the Fig. 4. The lamp 58 is operated likewise under joint control of the switches 50A and 54 and indicates the process of venting.

From the above brief explanation the general purpose of all main components of the apparatus becomes clear and we may now describe separate details and structural arrangement of the system more particularly.

The supporting legs 65 and 66 (Figs. 1 and 2) are made of sufficient height to place the handles 113 and 301 at a convenient level. These legs are appropriately fixed in a base plate (not shown) and they support a subframe plate 67 to which are affixed the side walls 21 and 22 and on which are mounted other parts of the pressure presetting mechanism.

In the space below the subframe plate 67 are mounted pressure reservoir 32 and automatically operated valves 35 and 36 (Figs. 3 and 4). In the remaining space below the plate 67 (Fig. 1) the flexible hose 42 (Figs. 3 and 4) may be suspended in any known in the art manner permitting its unreeling from and retraction into said space. The whole mechanism is covered by a streamlined housing 51 made preferably from light gage metal.

The shaft 20 is journaled in the side plates 21 and 22 over the subframe 67 (Figs. 1 and 2). The sector 28 is rotatably supported by the same shaft at one end. The tail 78 of the sector 28 is fastened to one end of the torsional spring 24 the other end of which is fastened to the lever 268 pinned or otherwise fastened to the shaft 20. The spring 24 may be either of spiral type or of helical variety as shown on Figs. 1 and 2, and in both cases is used to exert a torque upon the sector 28 upon rotation of the lever 268 fastened to the shaft 20.

The sector 28 cooperates with the rack 30 and piston 31 in the manner as hereinbefore explained so that the switches 43 and 44 or their appropriate equivalents are actuated to control the inlet and venting valves 35 and 36 (Fig. 4). It may be noted that the piston 31 in the cylinder may be replaced by a flexible diaphragm over a pressure chamber or by suitable flexible bellows as the movement of the rack 30 is rather small.

The spring 25 is fastened at one end to the lever 305 which is freely rotatably mounted upon the shaft 20. The rotation of the lever 305 in counterclockwise direction is limited by the edge 306 (Figs. 1 and 2) of the slot 308 provided in the plate 21. The pin 302 integral with the handle 301 abuts the edge 306 when the sector 28 forces it in that direction through abutment with the ear 307 provided on the adjunct 309 of the lever 305. When desired to remove the influence of the torque of the spring 25 upon the sector 28 the operator pulls the handle 301 (Fig. 2) leftward compressing the spring 310 and rotates the lever 305 counterclockwise (Fig. 1) to place the pin 302 into the notch 303.

Upon such positioning of the lever 305, the sector 28 is urged clockwise by the torque of the spring 24 alone and counterclockwise by the torque provided by the rack 30 from the air pressure upon the piston 31. The limits between which the sector 28 may then move are the screw 84 and the ear 307, which in this case is in the position shown by the dotted lines at 307a (Fig. 1). In the latter adjustment position whenever the pressure on the piston 31 provides a force greater than that delivered to the rack 30 by the prewind of the spring 24, the sector 28 goes upward to the abutment with the ear 307. If this pressure is less than said force the screw 84 serves as a limiting abutment.

The second end of the spring 25 is fastened to the stud 311 (Figs. 2 and 4) which stud is an integral part of the wheel 312. The wheel 312 is freely pivoted on the shaft 20 and during assembly of the apparatus is rotated by the crank 313 to impart to the spring 25 the tension supplying the desired torque to the lever 305. After having tensioned in this manner the spring 25, the wheel 312 is affixed against further motion by the clamp screw 314 (Fig. 2).

The wheel 110 equipped with a handle 113 has a protrusion 90 cooperating with a notched ring 74. The wheel 110 is slidable in the keyway 111 and the lug 90 is normally held in engagement with one of the notches on the ring 74 due to the action of the compression spring 112. The operator when desired to change the prewind of the spring 24 pulls the hand crank 113 (Fig. 2) in the direction of the arrow 113 and then rotates it by the desired amount.

The counting wheel 272 is fastened to the shaft 20 to rotate with it as an integral part so that the figures on that wheel pass by the window 76 provided in the housing. There are 10 figures located at equal intervals of the wheel 272. These figures are marked "0, 1, 2, 3, 4, 5, 6, 7, 8, 9," and the notches in the ring 74 are spaced so that whenever the lug 90 is in one of the notches in the ring 74 one of the figures on the wheel 272 is displayed in the window 76 in proper position.

The wheel 273 has also ten figures on its periphery and is rotatably supported by the shaft 20. Only six figures (from 1 to 6), however, are permitted ever to pass past the window 77. After this a suitable stop lug (not shown) on the wheel 273 will prevent further rotation of the shaft 20. The transfer wheel 114 cooperates with both wheels 272 and 273 in such a manner that whenever the wheel 272 is advanced with figure "9" passing the window 76 and "0" appearing in it the wheel 273 is rotated together with 272 so that it is advanced one figure. Upon reversing of the rotation of the shaft 20 the wheel 273 is moved by the transfer wheel 114 when the wheel 272 is moved through "0" with "9" advancing. The action of the transfer wheel 114 is well known in the art and is described in many publications for example such as U. S. Patents Numbers 103,221 or 1,370,540 and many others.

Due to this action of the revolution counter system 272, 273 and 114, the figures in the windows 77 and 76 will always show the quantity of the tenths of turns by which the shaft 20 was advanced from initial position in which the winding of the spring 24 was supplying zero torque to the segment 28.

For example the figures 53 in the windows 77 and 76, as shown on Fig. 2, would be thus displayed, after the hand crank 110 was rotated five turns and three-tenths of one turn in the clockwise direction (when looking at the hand crank end of the device). Suppose that the spring 24 is so dimensioned that each one-tenth of one revolution provides increase of torque on the lever 78 so as to supply one-tenth of one pound of downward force on the rack 30 while the area of the piston 31 is one-tenth of one square inch. Suppose further that the handle 301 is positioned against the notch 303 so as to remove the torque of the spring 25 from the sector 28. Then 53 pounds per square inch air pressure in the reservoir 32 will keep the cross piece 41 (Figs. 1, 2 and 4) in the positions whereby the switch 43 will be actuated by the screw 39 and this will keep the valve 35 closed. The switch 44 under these conditions will not be actuated by the screw 40 and this will keep the valve 36 also closed.

The increase of pressure in the reservoir 32 by, say, one half pound per square inch will increase the upward force upon the piston 31 by five hundredths of one pound. Since the spring 24 for each 36° of angular deflection (one tenth of the revolution) of one of its ends relatively to the other end provides one tenth of one pound force downwards upon the rack 31, the sector 28 would rotate counter-clockwise by 18° at which position there will be again equality between this newly established value of clockwise torque of the spring 24 and the counter-clockwise torque provided by the upward force on the piston 31. Suppose the pitch diameter of the sector 28 is, say, one inch, then rotation of this sector through 18° will allow the upward motion of the rack 30 about $\frac{5}{16}$ of an inch. If the lower leaf of the switch 44 is placed say at ¼ of an inch from the top of the screw 40 (Fig. 1), (by properly adjusting during assembly of the device the screw 40) the above mentioned pressure differential will produce opening of the valve 36 and venting of the tire.

The active length of the spring 24 is adjusted during assembly when the ends of that spring are fastened to the levers 78 and 268. The correctness of this length is judged by the measurement of torque developed by that spring 24 under two separate angles of prewind. The similar procedure is applied in the assembly of the spring 25.

It may be noted here that the torque per angular deflection characteristics of both springs should be approximately similar to each other for more accurate operation of the device. The wheel 312, during assembly of the device is turned five full revolutions so as to establish the downward force on the rack 30, due to the tension of the spring 25, equal to that which would be counterbalanced by the force on the piston 31 produced by 50 pounds per square inch pressure. Then the release of the handle 301 from the notch 303 (Fig. 1) will add to the pressure indicated in the windows 77 and 76 an additional value of 50 pounds per square inch.

The release of the handle 301 from the notch 303 may be indicated by a suitable display of a flag (not shown on the drawing) attached to the lever 305 and to be visible through a suitable window (not shown) in the casing 51.

At this point there may be set forth an important observation about the influence on the operation of the device of the value of the rate of change of the force produced by the springs 24 and 25 upon the piston 31. This observation has already been mentioned earlier in this specification and may be now further expanded.

The prominent particularities of the pressure responsive means favored in the prior art structures of this type of fluid dispensers may be understood from examining the schematic diagram shown on Fig. 8.

A chamber 532 communicating with the tire to be filled with compressed air has a diaphragm 531 which operates the switch 543 in its turn operating the pressure inlet valve. This switch in many structures is substituted by some kind of toggle device operating such inlet valve directly. A spring 524 (either directly or through a force multiplying bell crank) produces a force, opposing the movement of the diaphragm 531, which movement is produced by the influence of gas pressure.

Suppose that the effective area of the diaphragm 531 exposed to the gas pressure is designated by $q$ and equals one square inch. Suppose further that the maximum pressure to be dispensed is 60 p. s. i. The force characteristic of the spring 524 for zero pressure dispensing would be then shown by the line 601. The spring 524 if compressed to its final length should have 60 pounds of opposing force directed rightward (Fig. 8) and no resistance at its free length.

By moving the adjusting screw 520 into position shown at 520a, the complete force characteristic of the spring 524 (from free length to the finally compressed length) would be illustrated by the line 602. However, on account of the restriction of space for the movement of the spring 524 (which space is limited by the abutment with diaphragm lever 531a) only that part of the force characteristic beginning from the line 603 will be manifest. Of that part of the characteristic only a small part between the points 604 and 605 will be in active play. This adjusted spring will admit 35 pounds per square inch into the tire and chamber 532 before giving way and opening the contact 543, which will operate the pressure inlet valve to stop further admission of air into the receiver and chamber 532.

Let us estimate the value of the differential of air pressure which differential would be upbuilt while the diaphragm 531 moves from the level 604 to the level 606. It may be easily seen that this pressure differential determines the accuracy of the pressure dispensing action of any apparatus of this kind and its determination is therefore of paramount importance. While making this estimate it may be noted that in all systems in which the spring such as 524 acts upon the diaphragm 531 not directly but through a force-multiplying lever, that pressure differential will be greater for the same diaphragm movement than the differential obtained in the direct spring action systems similar to the one schematically shown in Fig. 8, provided both springs are similar.

With the effective area $q$ of the diaphragm equal to one square inch, the initial force in pounds $P_{604}$ directed rightward and developed by the spring 524 at the moment when the air pressure $K_{604}$ in pounds per square inch inside of the chamber 532 just starts to move the diaphragm 531 from the level 604; that force $P_{604}$ (when $q=1$) is equal to the pressure $$P_{604}=K_{604} \quad (1)$$

Designate the maximum force of the spring 524 corresponding to the maximum pressure for which the apparatus is designed by $$P_{max}=K_{max} \quad (2)$$

Designate the total deflection of the spring 524 by $S_{max}$ and designate the ratio of $$\frac{K_{max}}{S_{max}}$$

by R $$\frac{K_{max}}{S_{max}}=\frac{P_{max}}{S_{max}}=R \quad (3)$$

Designate further the distance between the levels 604 and 606 by S (inches). Then the pressure $K_{606}$ (in pounds per square inch) necessary to move the diaphragm 531 into the level 606 will be equal to the force $P_{605}$ at the point of 605 of the force characteristic. Thus $$K_{606}=P_{605}=P_{604}+SR=K_{604}+SR \quad (4)$$

Thus the differential of pressure $$K_{606}-K_{604}=SR=K_{max}\,S\frac{1}{S_{max}} \quad (5)$$

Now, if diaphragm 531 has effective area equal to $q$ square inches then we have $$P_{604}=K_{604}q \quad (1a)$$

The maximum force for which spring 524 is designed will be then $$P_{max}=K_{max}q \quad (2a)$$

and the rate of spring force $$Z=\frac{P_{max}}{S_{max}}=\frac{K_{max}}{S_{max}}\,q=Rq \quad (3a)$$

In this case the force $P_{605}$ and pressure $K_{606}$ will be found as follows $$P_{605}=K_{606}q=P_{604}+SZ=K_{604}q+SRq \quad (4a)$$

or $$P_{606}=K_{606}q=(K_{604}+SR)q=\left(K_{604}+\frac{K_{max}S}{S_{max}}\right)q \quad (5a)$$

and for the pressure differential $$K_{606}-K_{604}=SR=K_{max}\,S\frac{1}{S_{max}} \quad (6a)$$

It may be noted thus that the value of $q$ does not influence this pressure differential when the rest of the dimensions of the apparatus are fixed.

This pressure differential determines the accuracy of the action of this type of dispensing apparatus, namely, the accuracy is the greater the smaller this pressure differential is.

The minimum value of the $K_{max}$ is fixed by the requirements of the dispensing function (it can not be for our purpose less than, say, 40 p. s. i.). The value of S is fixed by the requirements for reasonably noncritical tolerances in the operation of the contacts 543 or their mechanical equivalent (e. g. a valve operating toggle trip). In general for the electrically operated devices this distance S can not be made less than $\frac{1}{10}$ of an inch without getting into impractical critical adjustments. The value of $S_{max}$ heretofore favored in the previous structures of this kind of apparatus on the other hand was also of a very small magnitude.

Computing for example a pressure differential obtained in an apparatus having for example 60 p. s. i. maximum dispensable pressure equipped with a valve operating device actuated by $\frac{1}{10}''$ of diaphragm movement and having say 2 inches available for maximum deflection ($S_{max}$) we upbuild a pressure differential equal to about $60 \times 0.1 \times 0.5 = 3$ pounds per square inch.

Due to the filling of the tire by the consecutive discharges of compressed air not all of this pressure differential appears in the tire at the end of inflation. Successful venting of the overcharged tire, however, is exceedingly difficult to incorporate in the devices with this arrangement of the pressure measuring and pressure responsive means, as the above explained pressure differential is to be overcome first and an additional one upbuilt before the venting is started.

In the device of my invention, however, its inherent characteristics permit a wide latitude for proper choice of the forces and movements used for its functioning. On the Fig. 9, there is shown diagram of forces for the device with the piston 31 having an area of 1 square inch. The parts of that diagram similar to the parts appearing on the Fig. 8 are numbered identically which makes it self-explanatory.

Estimate of the pressure differential which is upbuilt when the piston 31 moves the cross piece 41 from the level 604 (Fig. 9) to the level 606 will be computed as follows.

Designate by $q$ (in square inches) the area of the piston 31 exposed to the air pressure.

By $K_{604}$, $P_{604}$, $K_{606}$, and $P_{605}$ designate the air pressures (in p. s. i.) and forces (in pounds) incident upon the piston 31 at corresponding points on the diagram, Fig. 9.

$P_{max}$ and $K_{max}$ will be respectively the maximum spring force and maximum air pressure to which the piston 31 is subjected at maximum value adjustment in the given apparatus.

We have correspondingly $$P_{604}=K_{604}q \quad (1b)$$

$$P_{max}=K_{max}q \quad (2b)$$

The rate of force produced by the spring 24 upon the rod 30 (and therefore piston 31) will be found as follows.

Each revolution of the sector 28 if that sector would be made up into a circular gear of the pitch radius $p$, would move the rack 30 by $6.28p$ inches and N full revolutions of that circular sector in counterclockwise direction would wind up the spring 24 to provide the force on the piston 31 $P_{max}=K_{max}q$. During these N revolutions the rack 30 would be moved $6.28Np$ inches which is equivalent of $S_{max}$ in our new system thus we may write $$Z^1=\frac{P_{max}}{S^1_{max}}=\frac{P_{max}}{6.28Np}=\frac{K_{max}}{6.28Np}q=R^1q \quad (3b)$$

Designating as before by S the distance between the levels 604 and 606 (Fig. 9) we will have for our forces $$P_{605}=K_{606}q=P_{604}+Sz^1=K_{604}q+SR^1q \quad (4b)$$

or $$P_{605}=(K_{604}+SR^1)q=\left(K_{604}+K_{max}\,S\frac{1}{6.28Np}\right)q \quad (5b)$$

and $$K_{606}-K_{604}=SR^1=K_{max}\,S\frac{1}{6.28Np} \quad (6b)$$

Computing a pressure differential obtained in our apparatus for the 60 p. s. i. maximum registry, having 1" pitch radius of the sector 28 and with one revolution of the shaft 20 upbuilding a force to compensate 10 pounds per square inch of air pressure we have for S=0.1 inch the differential equal to $$60 \times 0.1 \times \frac{1}{6.28 \times 6 \times 1} = 0.156 \text{ pound per square inch}$$

Writing in the equality (5b) the value $6.28Np=S^1$ we have the comparison between the characteristics of the previously known types and herein disclosed type of the pressure dispensing apparatus.

On the basis of this comparison we may make a statement that the characteristic of the force opposing the pressure force in the pressure responsive means in prior structures in most favorable cases (i. e. giving the least pressure differential) appears to correspond in substance to the following general formula $$P_{606} = \left( K_{606} + K_{max} S\frac{1}{6} \right) q \qquad (7b)$$

If, however, the full understanding of the phenomena controlling the action of these apparatus would be available at the time of their construction, the selection of the force characteristic for such a pressure responsive device in this kind of pressure dispensing apparatus would be made substantially in accordance with the following formula:

$$P_{606} = \left( K_{606} + K_{max} S\frac{1}{m} \right) q \qquad (8b)$$

whereby the value of $m$ should be selected to be of much greater value than 6; (all provided that $P_{606}$ is measured in pounds, $K_{606}$ and $K_{max}$ in p. s. i., S in inches and $q$ in square inches in both Formulae 7b and 8b).

The bracket 340 (Fig. 2) supports the bellows 341 inside of which bellows the spring 342 keeps the bellows 341 expanded as shown. The space inside the bellows communicates with outer air through the restricted passage 343 and the passage 344 normally closed by the valve 345. When the bellows 341 is compressed upward by contacting it with bracket 346 attached to the rack 30, the valve 344 is kept closed by the spring 347 and the air passes through the passage 343. This creates resistance to the upward movement of the rack 30 and retards such motion. When the rack 30 goes downward, however, the spring 342 tends to expand the bellows and thus creates suction which opens the valve 345 permitting the expansion of the bellows as quickly as the motion of the rack 30 allows.

The screw 348 is so adjusted that it does not contact the bellows until the switch 43 (Fig. 4) is actuated so that the opening and closing of the valve 35 follows instantly the motion of the rack 30 in response to pressure changes inside of the tank 32 (Fig. 4). The valve 36, however, due to the action of the bellows 341 opens only after certain time interval upon establishing the pressure in the tank 32 which pressure is capable to actuate the switch 44. Such retarding device is useful when the adjustment screw 40 (Figs. 1 and 4) is such that a very small pressure differential exists between the "venting" and "inflating" positions of the cross piece 41.

There are present during the action of this system instantaneous peaks of pressure created by the action of the valve 35 which admits air into the tank 32 generally more rapidly than the air is delivered into the tire. These peaks without the presence of the retarding device 342, 343 would produce undesired opening of the valve 36. With this device, however, the instantaneous excess of pressure in the tank 32 over that existing in the tire at the end of the inflation process could be always maintained sufficiently high to produce speedy completion of this process of inflation. This excess of pressure, however, does not necessitate the raising of pressure differential between the inflating and venting values of pressure for which the device is initially adjusted during its manufacturing.

Thus the time differential provided by the above described action of the bellows 341 (Fig. 2) allows lowering of the adjusted venting—inflating pressure differential without lowering the value of the excess of the pressure under which excess value the inflation is completed.

The tank 32 (Figs. 1, 3 and 4) is divided by the partition 93 (Figs. 3 and 4) into two sections communicating with each other by the adjustable orifice 94. The venting and inlet valves 35 and 36 are placed above the partition on the same side as the cylinder in which operates the piston 31. The hose going to the tire on the other hand is placed below this partition.

This arrangement contributes to the elimination of the flutter in the operation of the valves 35 and 36. When the valve 48 (Figs. 3, 4 and 5) is opened and the tire has smaller pressure than in the tank 32 the pressure falls off first in the lower part of the reservoir 33 and due to the action of the orifice 94 this falling off of the pressure is registered by the piston 31 slightly later than it would if there were no partition 93. When the piston 31 is forced down, contacts 43 open, thus opening the valve 35, which admits new pressure into upper part of the reservoir 32. This pressure also due to the orifice 94 builds up sooner in the upper part of the reservoir 32 than in the lower part thereof and thus the valve 35 closes slightly sooner than otherwise would have taken place (had there been no partition 93).

Thus the inflation of the tire takes place by the short blasts through the valve 35. Each opening of this valve 35 is followed by a definite time interval when the pressures in the upper and lower parts of the reservoir 32 are in process of equalizing through the orifice 94.

If the tire has greater pressure than the tank 32, then venting valve 36 will open later and close sooner than would be without the partition 93 and this venting will be performed also in several measured blasts thus avoiding "the hunting" of the valves 35 and 36 and increasing the overall accuracy of the action of this pressure governor.

The contacts 43 and 44 may operate the solenoids 45 and 46 either directly or through thermionic amplifiers A, A placed in the circuit as shown on Fig. 4.

It may be noted that exceptionally great amounts of movement of the control member made possible by using the above described structure of pressure responsive means, which movement is not accompanied with upbuilding of the undesirable pressure differentials within the displacing system, make it practicable to control the opening and closure of the valves 35 and 36 also by nonelectric means.

Fig. 3 shows such an alternative arrangement where the rack 30 operates air valves 95 and 96, put in place of the contacts 43 and 44. The valves 35 and 36 then are powered not by the solenoids 45 and 46 (Fig. 4) but by the diaphragms 97 and 98 respectively (Fig. 3). The rack 30 (Fig. 3) is operated by the sector 28 influenced by the springs 24 and 25 (Fig. 1) as already described earlier on this specification.

Under such an arrangement the signals of deflation and inflation may be obtained by providing the contacts such as 53 and 54 (Figs. 4 and 5) operated simultaneously with the valves 95 and 96 (Fig. 3) by the crosspiece 41. Also a nonelectric device such as shown on the Figs. 6 and 7 may be employed.

This device is placed in the hose 42 (Figs. 3, 4 and 6) between the valve 48 and the tire nozzle 47 (Figs. 3 and 4).

In the chamber 102 the vane 103 is pivoted on the shaft 104. The cylindrical bezel 110 is integral with the vane 103. The light springs 105, 106 keep this vane 103 in the centralized position as shown by solid lines on the Fig. 6.

Upon venting of the tire the vane 103 will be rocked into the position 103A shown by dotted lines on Fig. 6 by the air blast through the chamber 102 in the direction from the tire nozzle to the reservoir 32. This will exhibit on the opening 107 the part of the bezel 110 which part is marked 108 in Fig. 6. This part may be painted in, say, red color.

Upon the inflation of the tire the air blast will be in the direction towards the tire nozzle and the part marked 109 of the bezel 110 will be exhibited in the opening 107 and this part may be painted, say, green.

Upon termination of the air blast the springs 105 and 106 will centralize the vane 103 in the position as shown and the central part of the bezel 110 which may have white color will be exhibited in the opening 107, thus indicating the end of the inflation or venting process.

In conclusion of this discussion, it may be easily observed by those skilled in the art that some modifications in the circuit illustrated by the Fig. 4 are possible. For example the action of the switch 43 may be altered to suit the requirements of service of this device.

Namely: the valve 35 as shown on Fig. 4 is normally kept open by the spring 37 and closed by energization of the switch 43. Such an arrangement is advantageous when the air inlet from the high pressure range is normally shut off before entering the valve 35. Then the rack 30 is urged downward by whatever torque is preset on the springs 24 and 25 during last operation and switch 43 is open. Mere opening of the high pressure inlet to the valve 35 will bring the pressure in the reservoir 32 to the previously preset value.

On the other hand if the pressure inlet is normally kept open between operation then it is more advantageous to reverse the action of the solenoid 45 and spring 37 and make them identical in action with solenoid 46 and spring 38 in the valve 36. The switch 43 then should be devised to be kept open when the screw 39 reaches the equilibrium level and it should close when the rack 30 moves downward. Under this arrangement the pressure in the reservoir 32 will be always maintained to keep the rack 30 in the equilibrium position, the switch 43 open, solenoid 45 deenergized and valve 35 closed by the action of its spring.

These alternatives bear upon the amount of electric energy consumption in the device of this nature and upon the manner of usage as explained.

In the dimensioning of the springs 24 and 25 it is desirable that the rates with which their torques change upon the change of their angular deflections should be at least equal in both springs with preference given to flatter rate for the spring 25. Also the appreciable "wind up" encountered in the working of both springs makes it desirable to correlate the maximum fibre stresses, rates, and torques in a precise manner. Investigating these conditions I have discovered that these springs work the best when their dimensions are selected according to the following formulas:

Assume for the spring 24—

$P_0$—(in pounds) to be the value of the force required to keep the rack 30 in equilibrium, when the pressure in the cylinder 32a (Figs. 1 and 2) is at some arbitrary chosen value $K_0$ (in pounds per square inch).

$P_1$—(in pounds) to be the value of the force required to keep the rack 30 in equilibrium when the pressure in the cylinder 32a is at its maximum value $K_{max}$ p. s. i.) which the setting of the wheels 272 and 273 is capable to handle.

$p_r$—(in inches) to be pitch radius of the sector 28.

$a_0$—(in degrees) to be the value of the winding angle to which the handle 113 is rotated to obtain the force $P_0$ compensating the pressure $K_0$.

$a_1$—(in degrees) to be the value of the winding angle corresponding to the maximum windup which the wheels 272 and 273 will register. The angle $a_1$ will produce the torque in the spring 24 for the force compensating the pressure $K_{max}$. For the structure as illustrated on the Figs. 1 and 2 $a_1$ equals 6.5 turns or $$6.5 \times 360 = 2340 \text{ degrees}$$

$S_1$—(in pounds per square inch) to be the fibre stress occurring in the spring under the windup of $a_1$ degrees. It may come up for cold rolled steel wires ("music wire") to about 170,000 pounds per square inch.

$E$—Young's modulus for the spring material (for "music wire" $E=30,000,000$).

$D$—(in inches) to be the mean diameter of the coil of the spring 24.

$h$—(in inches) to be the available axial length for locating the spring 24. It is approximately equal to the distance between the lever 263 and sector 28 measured along the shaft 20 (Fig. 2).

$H$—(in inches) to be certain percentage "A" of the length "$h$," that is to say $H=hA$ wherein A is the coefficient smaller than unity. Upon this coefficient depends how much of the free space will be left between the individual turns of the spring 24. The smaller is "A," the greater is the distance between the turns of the spring 24. For convenience of assembly and straight line characteristics of spring torque "A" should be selected between 0.5 to 0.85.

$B$—to be a numerical coefficient used for correlating the values used in these formulas as afore given (i. e. poundal system units). The true value for B lies between 3600 and 3900. In as much, as due to the tolerances in spring making the final adjustment of the active length of the spring 24 must be made during the assembly of the apparatus, by pulling a greater or smaller amount of the wire through the tail 78 (Figs. 1 and 2) before clamping it there; either 3600 or 3900 or any intermediary value for B can be used in these formulas.

$N$—to be the amount of active turns in the spring 24. This value is determined by the below given formula.

$d$—(in inches) is the wire diameter for the spring. This also is the value sought for.

From the above named values there should be selected on the basis of the desired size and capacity of the apparatus the values for $P_1$, $a_1$, $P_r$, $h$ and $D$. On the basis of the above presented explanations select the value for "$A$." And arbitrarily choose the value for $P_0$ (less than $P_1$).

Then the value for $a_0$ should be computed as follows:

$$a_0 = \frac{a_1 P_0}{P_1} \qquad (1c)$$

The value for "$S_1$" then is to be found as follows:

$$S_1 = 10 \sqrt[5]{\left(\frac{E}{BDhA}\right)^3} \sqrt[5]{\left(\frac{a_1 P_1 - a_0 P_1}{P_1 - P_0}\right)^3 (P_1 p_r)^2} \qquad (2c)$$

If "$S_1$" found according to (2c) is greater than 170,000 it means that selected space ($D$ and $h$) precludes the working to the stress $S_1$. Therefore, since higher "$S_1$" is not desired, the product of "$Dh$" should be increased by providing greater length "$h$" or diameter "$D$" or both.

After the appropriate value for "$S_1$" is thus found the wire diameter "$d$" is computed in the way already known in the art namely:

$$d = \sqrt[3]{\frac{10 P_1 p_r}{S_1}} \qquad (3c)$$

Upon finding of the value for "$d$" the number of active turns "$N$" is found in an obvious way $$N = \frac{Ah}{d} \qquad (4c)$$

For example if we select for the spring 24 steel wire and $P_1=6.5$; $a_1=2340$; $p_r=1$; $h=3.0$; $D=2.5$; $A=0.85$ and $P_0=5$ we will have $$a_0 = \frac{2340 \times 5}{6.5} = 360 \times 5 = 1800 \text{ degrees}$$

$$S_1 = 10 \sqrt[5]{\left(\frac{30,000,000 \times (2340 \times 6.5 - 1800 \times 6.5)}{3600 \times 7.5 \times 0.85 \times 1.5}\right)^3} 42.2 =$$

$$163,000 \text{ (p. s. i.)}$$

$$d = \sqrt[3]{\frac{10 \times 6.5}{163,000}} = 0.074 \text{ (inch)}$$

$$N = \frac{0.85 \times 3}{0.074} = \frac{2.54}{0.074} = 33\tfrac{1}{2} \text{ active turns}$$

The dimensioning of the spring 25 is to be performed by the same formulas selecting the following values for $P_1=5$; $a_1=1800$; $p_r=1$; $h \times D=$ whatever the available space; $A=0.85$ and $P_0=4$. Appreciable space may be saved by using instead of round wires the ribbon steel. It may be demonstrated that establishing of a desired rate in such springs in the given space is easier to achieve than with the round wires. As an example, however, the above presented calculations demonstrates the method of construction sufficiently clear to be followed by those skillful in the art.

It may be observed that the device shown in Figs. 1 and 2 as well as the device shown in Fig. 3 comprises in general the force measuring devices. Namely, the force on the rack 30 may be supplied not only by the air pressure on the piston 31 but also by any other agency such as mass of an object whose weight it is desired to determine, hydraulic pressure, magnetic traction, etc.

In these cases the force can be delivered to the rack 30 by any suitable linkage and the condition of the equilibrium with the torque of the spring 24 is indicated by the operation of the switches 43 and 44, while the force itself may be read off from the figures exhibited in the windows 16 and 17. When both of the switches 43 and 44 are open the operator will decrease the spring pressure until the switch 43 closes. When both of the switches are closed the operator will increase the spring torque until the switch 44 opens. These switches may control, say, green and red lights (switch 43 controlling green). When both lamps are on or off the operator changes the spring torque accordingly and reads off the measured force when only green light burns.

The invention herein set forth is susceptible of various modifications and adaptations without departing from the scope thereof as hereafter claimed.

I claim:

1. In a device for charging a receiver with compressed gas of a type having a conduit for connecting the source of compressed gas with a receiver to be filled, a valve for controlling flow of fluid through said conduit, a chamber communicating with said conduit and having an orifice in its wall, a member disposed within said orifice and movable from a first position into a second position in response to the changes in the gas pressure incident in said chamber, means for closing said valve in response to the movement of said movable member into said second position, and a device for controlling the value of gas pressure with which said member is moved into said second position; said device comprising in combination: a first torsional spring, means movable for winding said first torsional spring, means for indicating the amount of movement of said movable means, and means for connecting said first torsional spring to said member for producing upon said member a force opposing said pressure induced movement of said member, a second torsional spring, means for connecting said second torsional spring to said movable member for producing upon it a force additional to that produced by said first torsional spring and settable means for removing the influence of said second torsional spring upon said movable member.

2. A regulating device as defined in the claim 1 having, in addition to the elements described in said claim 1, means for adjustment of wind up of said second torsional spring.

GEORGE V. NOLDE.

REFERENCES CITED

The following references are of record in the file of this patent:

UNITED STATES PATENTS

| Number | Name | Date |
|---|---|---|
| Re. 14,206 | Gibson | Oct. 24, 1916 |
| Re. 19,148 | Woodford | Apr. 24, 1934 |
| 1,097,322 | Hodge | May 19, 1914 |
| 1,154,934 | Pilling et al. | Sept. 28, 1915 |
| 1,480,297 | Parker | Jan. 8, 1924 |
| 1,950,532 | Wasson | Mar. 13, 1934 |
| 1,980,148 | Woodford | Nov. 6, 1934 |
| 2,029,085 | Sussin | Jan. 28, 1936 |
| 2,042,190 | Ragan | May 26, 1936 |
| 2,051,049 | Landberg | Aug. 18, 1936 |
| 2,100,057 | Krebs | Nov. 23, 1937 |
| 2,107,595 | Bourdon | Feb. 8, 1938 |
| 2,151,953 | Zimmerman | Mar. 28, 1939 |
| 2,182,519 | Handy | Dec. 5, 1939 |
| 2,190,506 | Wurr | Feb. 13, 1940 |

FOREIGN PATENTS

| Number | Country | Date |
|---|---|---|
| 782 | Germany | of 1877 |